(12) United States Patent
Andrasko et al.

(10) Patent No.: US 9,919,781 B1
(45) Date of Patent: Mar. 20, 2018

(54) SYSTEMS AND METHODS FOR AUTOMATICALLY CONTROLLING ATTITUDE OF A MARINE VESSEL WITH TRIM DEVICES

(71) Applicant: Brunswick Corporation, Lake Forest, IL (US)

(72) Inventors: Steven J. Andrasko, Oshkosh, WI (US); Andrew J. Przybyl, Berlin, WI (US); Steven M. Anschuetz, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 196 days.

(21) Appl. No.: 14/873,803

(22) Filed: Oct. 2, 2015

Related U.S. Application Data

(60) Provisional application No. 62/183,392, filed on Jun. 23, 2015.

(51) Int. Cl.
*B63H 20/10* (2006.01)
*B63H 21/22* (2006.01)
*B63J 99/00* (2009.01)
*G05D 3/12* (2006.01)

(52) U.S. Cl.
CPC .............. *B63H 20/10* (2013.01); *B63J 99/00* (2013.01); *G05D 3/12* (2013.01); *B63J 2099/006* (2013.01)

(58) Field of Classification Search
None
See application file for complete search history.

(56) References Cited

U.S. PATENT DOCUMENTS

| 3,682,127 A | 8/1972 | Waquet |
| 3,777,694 A | 12/1973 | Best |
| 3,999,502 A | 12/1976 | Mayer |

(Continued)

FOREIGN PATENT DOCUMENTS

| EP | 2368791 B1 | 1/2013 |
| WO | 2000068744 A1 | 11/2000 |

OTHER PUBLICATIONS

Andrasko et al., "Systems and Methods for Automatically Controlling Attitude of a Marine Vessel with Trim Devices", Unpublished U.S. Appl. No. 14/873,803, filed Oct. 2, 2015.

(Continued)

*Primary Examiner* — Thomas G Black
*Assistant Examiner* — Demetra R Smith-Stewart
(74) *Attorney, Agent, or Firm* — Andrus Intellectual Property Law, LLP

(57) ABSTRACT

Systems and methods disclosed herein control position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

20 Claims, 7 Drawing Sheets

(56) References Cited

U.S. PATENT DOCUMENTS

| | | |
|---|---|---|
| 4,050,359 A | 9/1977 | Mayer |
| 4,318,699 A | 3/1982 | Wenstadt et al. |
| 4,413,215 A | 11/1983 | Cavil et al. |
| 4,490,120 A | 12/1984 | Hundertmark |
| 4,565,528 A | 1/1986 | Nakase |
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,007,866 A * | 4/1991 | Okita ................ B63H 21/265 440/61 D |
| 5,113,780 A | 5/1992 | Bennett et al. |
| 5,118,315 A | 6/1992 | Funami et al. |
| 5,142,473 A | 8/1992 | Davis |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,095,077 A | 8/2000 | DeAgro |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,458,003 B1 * | 10/2002 | Krueger ................ B63H 20/10 440/1 |
| 6,583,728 B1 | 6/2003 | Staerzl |
| 6,733,350 B2 | 5/2004 | Lida et al. |
| 6,745,715 B1 | 6/2004 | Shen et al. |
| 6,994,046 B2 | 2/2006 | Kaji et al. |
| 6,997,763 B2 | 2/2006 | Kaji |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,389,165 B2 | 6/2008 | Kaji |
| 7,416,456 B1 | 8/2008 | Gonring et al. |
| 7,462,082 B2 | 12/2008 | Kishibata et al. |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B1 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 | 7/2012 | Moore |
| 8,261,682 B1 | 9/2012 | DeVito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,762,022 B1 | 6/2014 | Arbuckle et al. |
| 8,807,059 B1 | 8/2014 | Samples et al. |
| 8,840,439 B1 * | 9/2014 | Wiatrowski ........... B63H 20/10 440/61 T |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,156,536 B1 | 10/2015 | Arbuckle et al. |
| 9,278,740 B1 | 3/2016 | Andrasko et al. |
| 9,290,252 B1 | 3/2016 | Tuchscherer et al. |
| 9,381,989 B1 | 7/2016 | Poirier |
| 9,517,825 B1 * | 12/2016 | Anschuetz ............. B63H 20/06 |
| 9,598,160 B2 * | 3/2017 | Andrasko ............. B63H 20/10 |
| 9,764,810 B1 * | 9/2017 | Andrasko ............. B63H 20/10 |
| 2003/0013359 A1 | 1/2003 | Suganuma et al. |
| 2004/0224577 A1 * | 11/2004 | Kaji ................... G05B 13/0275 440/1 |
| 2005/0245147 A1 | 11/2005 | Takada et al. |
| 2007/0089660 A1 | 4/2007 | Bradley et al. |
| 2011/0263167 A1 | 10/2011 | Chiecchi |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1 | 10/2014 | Kuriyagawa et al. |
| 2016/0068247 A1 | 3/2016 | Morvillo |

OTHER PUBLICATIONS

Anschuetz et al., "System and Method for Trimming a Trimmable Marine Device With Respect to a Marine Vessel", Unpublished U.S. Appl. No. 15/003,326, filed Jan. 21, 2016.

Anschuetz et al., "System and Method for Trimming Trimmable Marine Devices With Respect to a Marine Vessel", Unpublished U.S. Appl. No. 15/003,335, filed Jan. 21, 2016.

O'Brien et al., "Systems and Methods for Setting Engine Speed Relative to Operator Demand", Unpublished U.S. Appl. No. 14/684,952, filed Apr. 13, 2015.

Dengel et al., "Trim Control Systems and Methods for Marine Vessels", Unpublished U.S. Appl. No. 13/770,591, filed Feb. 19, 2013.

Mercury Marine, 90-8M0076286 JPO Service Manual—Auto Trim Portion, Theory of Operation, Jul. 2013, p. 2A-5.

Mercury Marine, 90-8M0076286 JPO Service Manual—Auto Trim Portion, Section 2—On the Water, May 2013, p. 21.

Andrasko et al., "Systems and Methods for Providing Notification Regarding Trim Angle of a Marine Propulsion Device", Unpublished U.S. Appl. No. 14/573,200, filed Dec. 17, 2014.

Andrasko et al., "System and Method for Controlling Attitude of a Marine Vessel Having Trim Tabs", Unpublished U.S. Appl. No. 14/472,565, filed Aug. 29, 2014.

Andrasko et al., "Systems and Methods for Controlling Movement of Drive Units on a Marine Vessel", Unpublished U.S. Appl. No. 14/177,762, filed Feb. 11, 2014.

Mercury Marine, 90-8M0081623 JPO Owners Manual—Auto Trim Portion, Section 2—On the Water, May 2013, p. 21.

* cited by examiner

SYSTEMS AND METHODS FOR AUTOMATICALLY CONTROLLING ATTITUDE OF A MARINE VESSEL WITH TRIM DEVICES

CROSS-REFERENCE TO RELATED APPLICATION

The present application claims the benefit of U.S. Provisional Application Ser. No. 62/183,392, filed Jun. 23, 2015, which is hereby incorporated by reference herein.

FIELD

The present disclosure relates to systems and methods for controlling an attitude of a marine vessel.

BACKGROUND

U.S. Pat. No. 4,861,292, incorporated by reference herein, discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391, incorporated by reference herein, discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,416,456, incorporated by reference herein, discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820, incorporated by reference herein, discloses a method for controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for controlling a trim position of a trimmable drive unit with respect to a marine vessel includes determining a target trim position of the drive unit as a function of one of a vessel speed and an engine speed. The method also includes measuring an actual trim position of the drive unit and comparing the actual trim position to the target trim position with a controller. The controller sends a first control signal to a trim actuator to trim the drive unit in a first direction toward the target trim position in response to a determination by the controller that the actual trim position is not equal to the target trim position and that at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

A system for controlling a trim position of a trimmable drive unit with respect to a marine vessel is also disclosed. A trim actuator positions the drive unit with respect to the marine vessel. A trim sensor determines an actual trim position of the drive unit. A controller determines a target trim position of the drive unit as a function of one of a vessel speed and an engine speed. The controller is in signal communication with the trim actuator and the trim sensor. The controller compares the actual trim position to the target trim position. The controller sends a first control signal to the trim actuator to trim the drive unit in a first direction toward the target trim position in response to a determination that the actual trim position is not equal to the target trim position and that at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

Yet another example of the present disclosure is of a method for controlling a trim position of a trimmable drive unit with respect to a marine vessel. The method includes determining a target trim position of the drive unit as a function of one of a vessel speed and an engine speed; measuring an actual trim position of the drive unit; and comparing the actual trim position to the target trim position with a controller. The method includes sending a first control signal to a trim actuator to trim the drive unit in a first direction toward the target trim position in response to a determination by the controller that the actual trim position is not equal to the target trim position. The controller sends a second control signal for a defined brake time to trim the drive unit in an opposite, second direction in response to a determination that the actual trim position has one of achieved and exceeded the target trim position. In one example, the brake time is on the order of tens of milliseconds.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
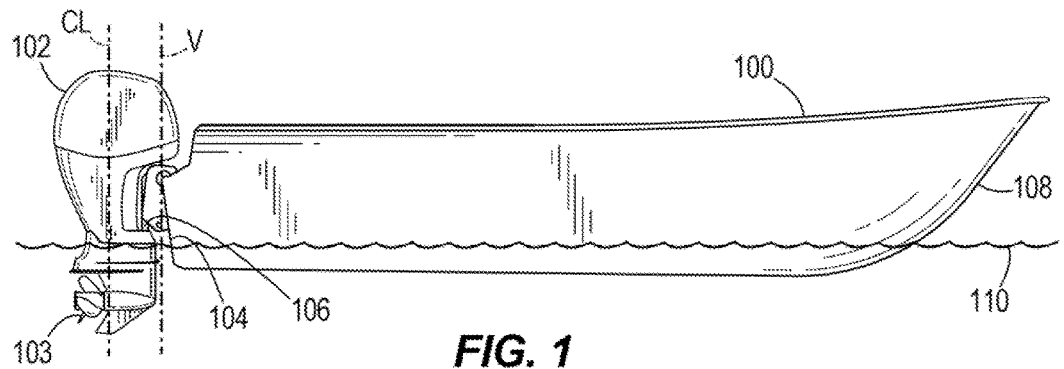
FIG. 1 illustrates a marine vessel having a trimmable drive unit.

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling one or more trim actuators on a marine vessel so as to control a relative position of a component of a marine propulsion system with respect to the marine vessel. In one example, the trim actuator is a hydraulic piston-cylinder in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of such trim actuators can be used to rotate other marine devices, such as components of the vessel's propulsion system, up and down with respect to a marine vessel to which they are coupled. Examples of such other marine devices include, but are not limited to: trim tabs, trim deflectors, and/or marine propulsion devices such as outboard motors or lower units of stern drives.

Those skilled in the art of marine vessel propulsion and control are familiar with many different ways in which the trim angle of a marine device such as an outboard motor can be varied to change the handling or feel of the vessel. For example, many manual trim control systems are known to those skilled in the art. In typical operation, the operator of a marine vessel can change the trim angle of an associated outboard motor as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices. The operator can select these input choices to trim the outboard motor up or down until a desired handling or feel of the vessel over the water is achieved.

The systems of the present disclosure are also capable of carrying out automatic trim (auto-trim) methods, in which the outboard motor is automatically trimmed up or down with respect to its current position, depending on a desired attitude of the marine vessel with respect to vessel speed. Auto-trim systems perform the trim operation automatically, as a function of vessel speed, without requiring intervention by the operator of the marine vessel. The automatic change in trim angle of the outboard motor enhances the operation of the marine vessel as it achieves planing speed and as it further increases its velocity over the water while on plane. Other trim devices such as trim tabs can also be automatically positioned to affect vessel roll and pitch, but the focus of the application described herein below is on an auto-trim system that determines optimal trim angles of trimmable drive units such as but not limited to outboard motors or stern drives based on at least vessel speed. For some examples of such systems, see U.S. Pat. Nos. 4,861,292 and 7,416,456, incorporated by reference herein above.

FIGS. 1-4 illustrate one example of a marine vessel 100 (FIGS. 1-3) having a system 111 (FIG. 4) for controlling an attitude of the marine vessel 100. The marine vessel 100 has a trimmable drive unit 102, such the outboard motor shown herein, coupled to the transom 104 of the marine vessel 100. In other examples, the drive unit 102 could be, for example, a pod drive or stern drive. The position of the drive unit 102 with respect to the transom 104 is controlled by a trim actuator 106 (see also FIG. 6). The drive unit 102 has an engine 123 that turns a propeller 103 to produce a thrust to propel the marine vessel 100 in a generally forward direction. The drive unit 102 is capable of rotating around a generally vertical steering axis in response to commands from a steering wheel 24 or autopilot section.

Figure 6:
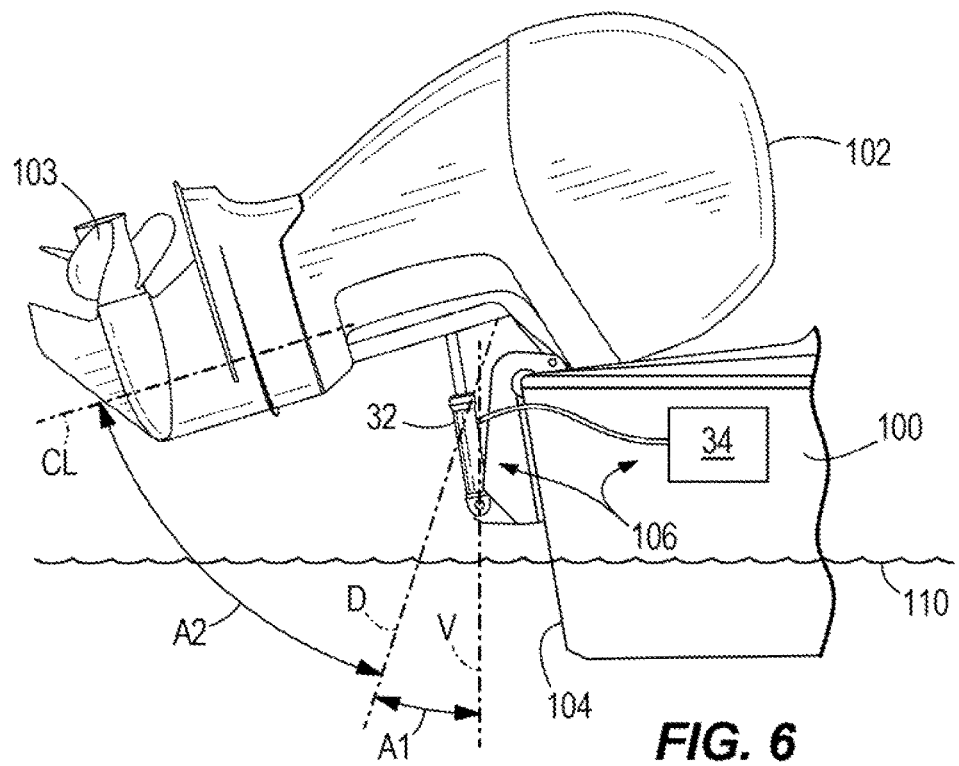
FIG. 6 illustrates a drive unit in a tilt position.

Now referring to FIG. 6, as mentioned, the position of the drive unit 102 with respect to the transom 104 of the marine vessel 100 is controlled by a trim actuator 106. The trim actuator 106 may comprise a hydraulic piston-cylinder 32 connected to a hydraulic pump-motor combination 34. The piston-cylinder 32 has one end (here, the cylinder end) coupled to the transom 104 of the vessel 100 and the other end (here, the piston rod end) coupled to the drive unit 102, as known to those having ordinary skill in the art. The piston-cylinder 32 operates to rotate the drive unit 102 to a trimmed-out position, to a trimmed-in position, or to maintain the drive unit 102 in any position therebetween as the pump-motor combination 34 provides hydraulic fluid to one side or the other of the piston to extend and retract the piston rod from the cylinder. As mentioned, however, other types of hydro-mechanical or electro-mechanical actuators could be used in other examples.

Figure 2:
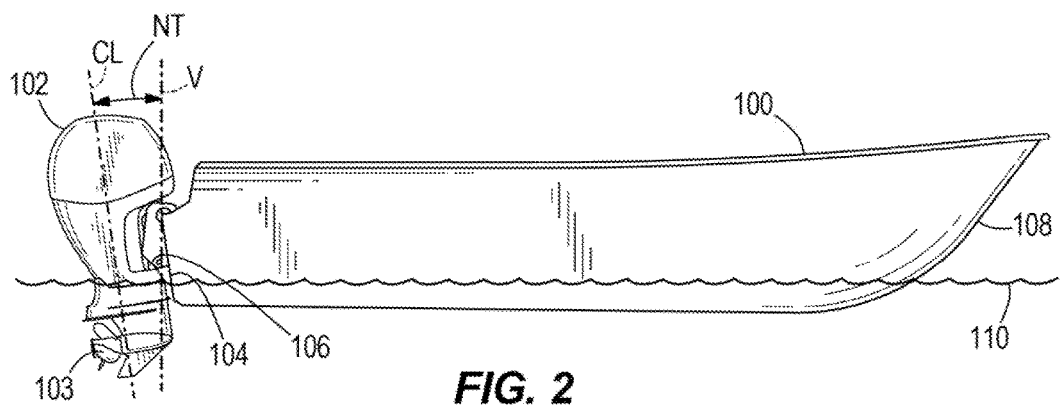
FIG. 2 illustrates the marine vessel of FIG. 1, with the drive unit in a trimmed in position.
Figure 3:
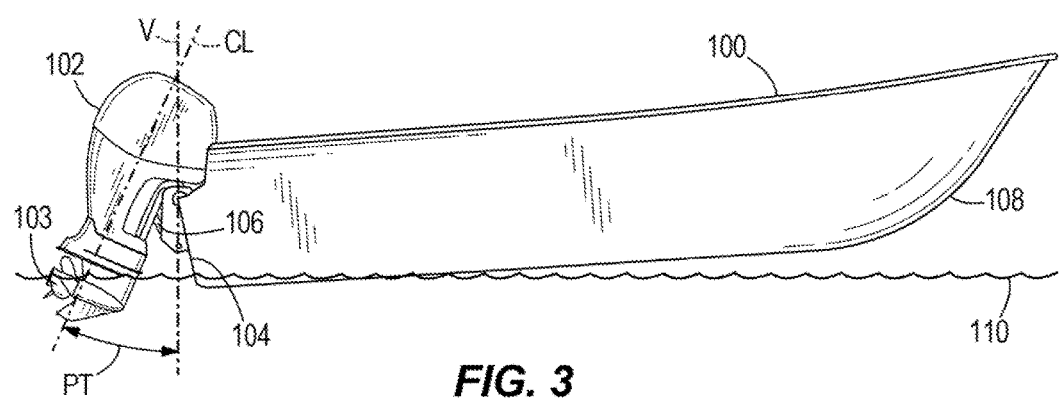
FIG. 3 illustrates the marine vessel of FIGS. 1 and 2, with the drive unit in a trimmed out position.

The trim actuator 106 can position the drive unit 102 at different angles with respect to the transom 104. In FIG. 1, the drive unit 102 is shown in a neutral (level) trim position, in which the drive unit 102 is in more or less of a vertical position. This can be seen by comparing centerline CL of the drive unit 102 with vertical line V, where the two lines are parallel. In FIG. 2, the drive unit 102 is shown in a trimmed in (trimmed down) position. In other words, the lines CL and V will intersect below where the drive unit 102 is connected to the transom 104. This may be referred to as a negative trim angle (NT) according to an exemplary convention. In FIG. 3, the drive unit 102 is shown in a trimmed out (trimmed up) position. The lines CL and V will intersect above the drive unit's connection point to the transom 104. This may be referred to as a positive trim angle (PT). The positions in FIGS. 1 and 2 are generally used when the marine vessel 100 is operating at slower speeds. For example, the trim position shown in FIG. 1 is often used when the marine vessel is in a joysticking mode or is docking. The trim position in FIG. 2 is often used during launch of the marine vessel 100, before the marine vessel has gotten up to speed and on plane. In contrast, the trim position shown in FIG. 3 is often used when the marine vessel is on plane and high speeds are required. At high speeds, the trim position shown in FIG. 3 causes the bow 108 of the marine vessel 100 to rise out of the water 110 as shown.

Figure 4:
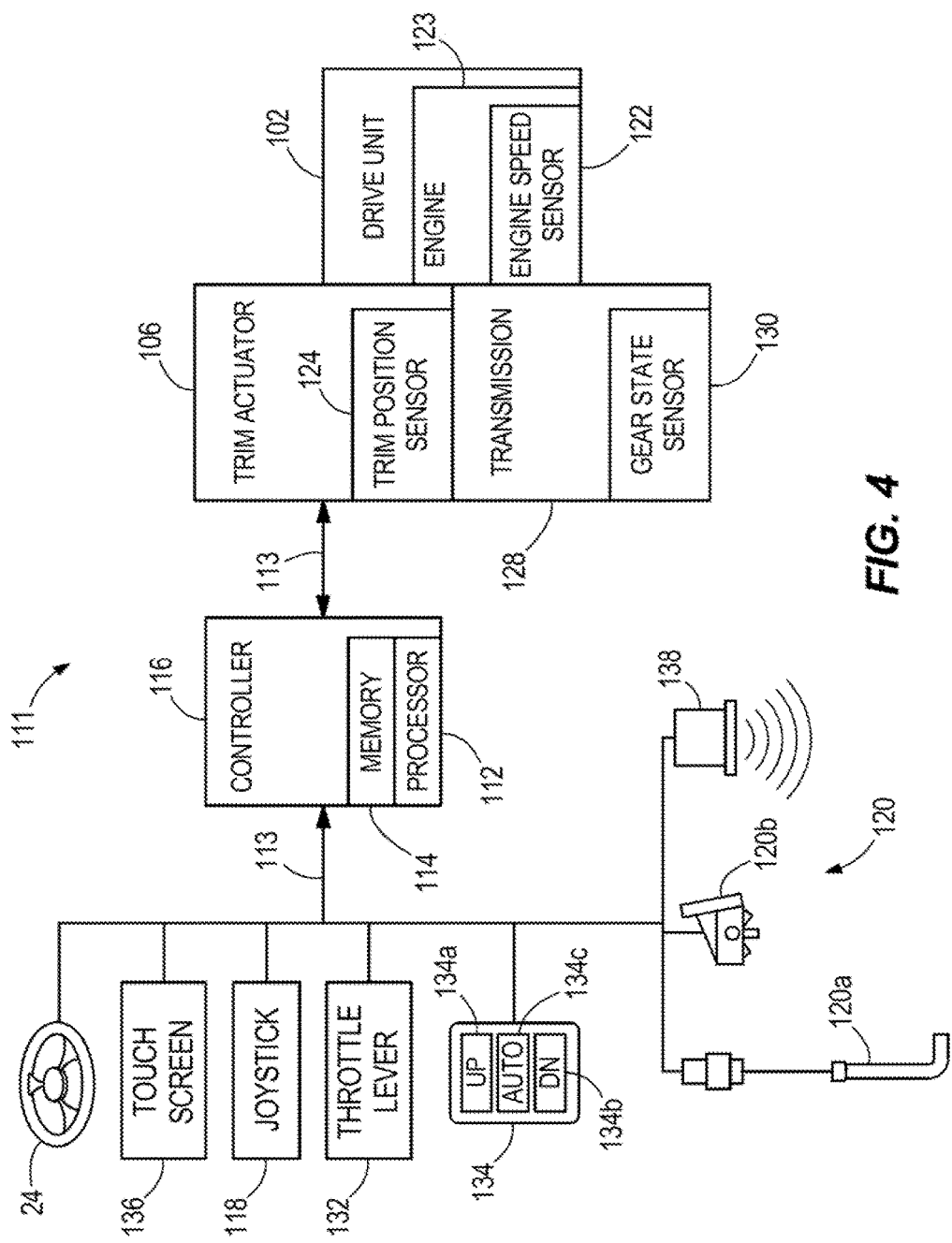
FIG. 4 illustrates system for controlling a trim position of the drive unit with respect to the marine vessel according to one example of the present disclosure.

FIG. 4 shows a schematic of the system 111 associated with the marine vessel 100 of FIGS. 1-3. In the example shown, the system 111 includes a controller 116 that is programmable and includes a processor 112 and a memory 114. The controller 116 can be located anywhere in the system 111 and/or located remote from the system 111 and can communicate with various components of the marine vessel 100 via wired and/or wireless links, as will be explained further herein below. Although FIG. 4 shows a single controller 116, the system 111 can include more than one controller 116. For example, the system 111 can have a controller 116 located at or near a helm of the marine vessel 100 and can also have one or more controllers located at or near the drive unit 102. Portions of the method can be carried out by a single controller or by several separate controllers. Each controller 116 can have one or more control sections or control units. One having ordinary skill in the art will recognize that the controller 116 can have many different forms and is not limited to the example that is shown and described. For example, here the controller 116 carries out the trim control method for the entire system 111, but in other examples separate trim control units and propulsion control units could be provided.

In some examples, the controller 116 may include a computing system that includes a processing system, storage system, software, and input/output (I/O) interfaces for communicating with devices such as those shown in FIG. 4, and about to be described herein. The processing system loads and executes software from the storage system, such as software programmed with a trim control method. When executed by the computing system, trim control software directs the processing system to operate as described herein below in further detail to execute the trim control method. The computing system may include one or many application modules and one or more processors, which may be communicatively connected. The processing system can comprise a microprocessor (e.g., processor 112) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 114) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 116 communicates with one or more components of the system 111 via a communication link 113, which can be a wired or wireless link. The controller 116 is capable of monitoring and controlling one or more operational characteristics of the system 111 and its various subsystems by sending and receiving control signals via the communication link 113. In one example, the communication link 113 is a controller area network (CAN) bus, but other types of links could be used. It should be noted that the extent of connections of the communication link 113 shown herein is for schematic purposes only, and the communication link 113 in fact provides communication between the controller 116 and each of the sensors, devices, and various subsystems described herein, although not every connection is shown in the drawing for purposes of clarity.

As mentioned, the controller 116 receives inputs from several different sensors and/or input devices aboard or coupled to the marine vessel. For example, the controller 116 receives a steering input from a joystick 118 and/or a steering wheel 24. The controller 116 is provided with an input from a vessel speed sensor 120. The vessel speed sensor 120 may be, for example, a pitot tube sensor 120a, a paddle wheel type sensor 120b, or any other speed sensor appropriate for sensing the actual speed of the marine vessel. The vessel speed may instead be obtained by taking readings from a GPS device, which calculates speed by determining how far the vessel has traveled in a given amount of time. The drive unit 102 is provided with an engine speed sensor 122 such as but not limited to a tachometer that determines a speed of the engine 123 powering the drive unit 102 in rotations per minute (RPM). A trim position sensor 124 is also provided for sensing an actual position of the trim actuator 106, for example, by measuring a relative position between two parts associated with the trim actuator 106. The trim position sensor 124 may be any type of sensor known to those having ordinary skill in the art, for example a Hall effect sensor or a potentiometer. A transmission 128 and gear state sensor 130 (sensing forward, neutral, or reverse gear of the transmissions) can also be provided for the drive unit 102. The gear state sensor 130 may be a potentiometer and electronic converter, such as an analog to digital converter that outputs a discrete analog to digital count that represents a position of a shift linkage associated with the transmission, or may be a potentiometer sensing a position of a throttle lever 132 as signifying a gear state of the transmission.

Other inputs can come from operator input devices such as the throttle lever 132, a keypad 134, and a touchscreen 136. The throttle lever 132 allows the operator of the marine vessel to choose to operate the vessel in neutral, forward, or reverse, as is known. The keypad 134 can be used to initiate or exit any number of control or operation modes (such as auto-trim mode), or to make selections while operating within one of the selected modes. In one example, the operator input device such as the keypad 134 comprises an interface having at least a "trim up" input 134a, a "trim down" input 134b, and an "auto-trim on/resume" input 134c, shown herein as buttons. The controller 116 operates the system 111 in the manual mode in response to selection of one of the "trim up" 134a and "trim down" inputs 134b. For example, a trim up command will actuate the trim actuator 106 to trim the trim tab or drive unit up, while a trim down command will command the trim actuator 106 to trim the drive unit 102 down. On the other hand, the controller 116 may operate the system 111 in the automatic mode in response to selection of the "auto-trim on/resume" input 134c. The touchscreen 136 can also be used to initiate or exit any number of control or operation modes (such as trim up, trim down, or auto-trim mode), and in that case the inputs can be buttons in the traditional sense or selectable screen icons. The touchscreen 136 can also display information about the system 111 to the operator of the vessel, such as engine speed, vessel speed, trim angle, trim operating mode, propulsion system operating mode, etc. A water depth sensor 138 such as a sonar may also be provided.

Figure 5:
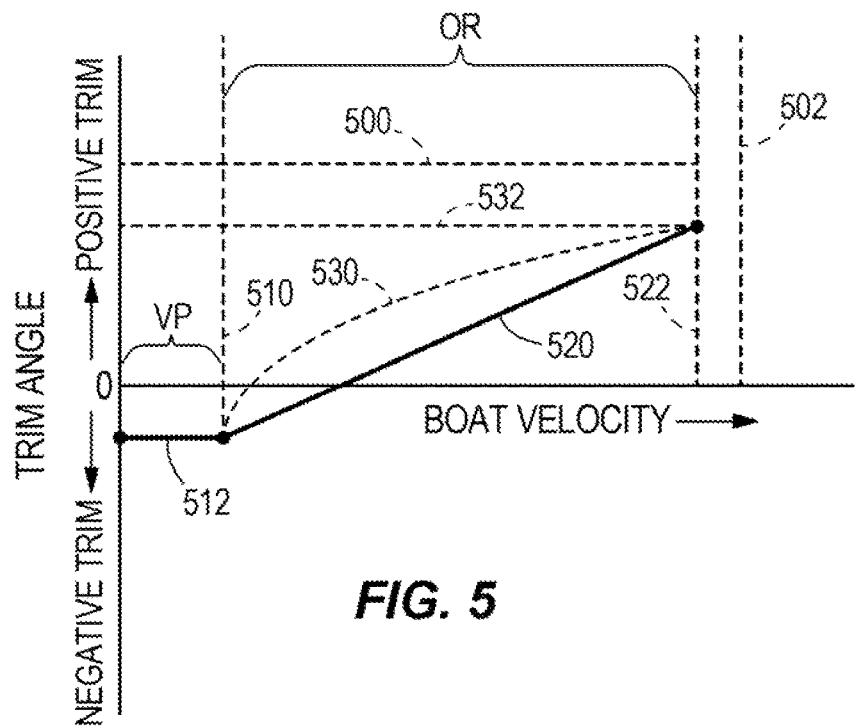
FIG. 5 is a graph showing an exemplary relationship between boat speed and an automatically-commanded trim angle.

As mentioned, the controller 116 may control the system 111 in an automatic mode, in which the controller 116 sends control signals to the trim actuator 106 automatically as a function of a speed of the vessel 100. For example, FIG. 5 is a graphical representation showing an exemplary relationship between the trim angle of a drive unit 102 and the velocity of a marine vessel 100 according to an exemplary auto-trim method. It should be noted that the graph shown in FIG. 5 is meant to show position of a drive unit 102 such as an outboard motor or a stern drive according to the positive and negative trim angle conventions described herein with respect to FIGS. 1-3. However, other conventions could be used in other examples. It should also be noted that the auto-trim method could instead relate trim angle to engine speed instead of vessel speed. The relationship between these two values could be similar to that shown here; however, a separate graphical illustration is not provided.

Dashed line 500 represents a maximum positive trim angle PT of the drive unit 102 that will maintain the drive unit 102 in the water at a functional position. Dashed line 502 represents the maximum velocity of the marine vessel 100. Dashed line 510 represents the planing speed of the marine vessel 100. Line 512 represents the change in velocity of the marine vessel 100 from a stationary condition to the achievement of planing speed at dashed line 510. This increase in velocity is identified as VP in FIG. 5. In one example, the trim angle of the drive unit 102 is maintained at a negative magnitude of NT such as shown in FIG. 2. This negative trim angle is maintained until the marine vessel 100 reaches planing speed 510. Then, the trim angle is increased as a function of vessel speed as indicated by line 520 in FIG. 5. This continues until the marine vessel 100 achieves a velocity which is represented by dashed line 522. It can be seen that this velocity represented by dashed line 522 is less than the maximum velocity 502 of the marine vessel. The range of speeds between dashed lines 510 and 522 is identified as its operating range OR between first and second speed magnitudes during which the trim angle is changed, according to this example, as a function of the vessel speed. In FIG. 5, this rate of change is linear as represented by line 520. However, as represented by dashed line 530, this relationship need not be linear in all applications. Dashed line 532 represents the maximum trim that is achieved during automatic trim operation when the marine vessel achieves the second speed magnitude 522. In one example, this maximum trim is trim angle PT shown in FIG. 3.

With continued reference to FIG. 5, it should be understood that the relationship between trim angle and vessel speed, between the first and second speed magnitudes 510 and 522, could be accomplished in discreet steps. Although the overall relationship may be linear as represented by line 520 between dashed lines 510 and 522, the overall linearity may be accomplished by changing the trim angle in a finite number of steps. In other words, the change in trim angle from the velocity represented by dashed line 520 to the trim angle 532 at the velocity represented by dashed line 522 may comprise, for example, twenty velocity ranges which are each associated with a particular trim angle. As the speed of the vessel increases, the trim angle would then be changed in discreet increments. The advantage of this particular approach is to reduce the cycle time of the hydraulic pump and other components used to physically move the drive unit 102 to achieve the desired trim angles associated with the particular instantaneous speed of the vessel.

One issue with many auto-trim systems is that trim systems are often controlled according to the above-mentioned discrete steps and are thus actuated to be either on or off. Generally, when a relay is energized for a specific amount of time in order to control the trim actuator 106, the system will either overshoot or undershoot the target trim position by a small amount. This makes it difficult to hit an exact trim position. Other issues that may contribute to the inaccuracy of some trim positions is that some trim position sensors 124 have a bowtie configuration instead of a Hall effect, which bowtie configuration has production tolerances and/or slop. A method according to the description provided herein with respect to FIG. 7 may be used in order to more accurately control the trim position of a drive unit 102 upon activation of the trim actuator 106.

In block 702, the controller 116 determines a target trim position of the drive unit 102 as a function of vessel speed, as described with respect to FIG. 5. For example, this can be done by accessing a lookup table or similar input-output chart in the memory 114 that returns a target trim position associated with an actual speed of the vessel as measured by one of the sensors 120a, 120b. In other examples, the controller 116 uses the actual vessel speed to calculate the target trim position from an equation relating the two variables. In block 704, the controller 116 measures an actual trim position of the drive unit 102. The actual trim position is determined by the trim position sensor 124. In block 706, the controller 116 compares the actual trim position to the target trim position. For example, the controller 116 determines if the actual trim position is less than, equal to, or greater than the target trim position. In block 708, the controller 116 sends a first control signal to the trim actuator 106 to trim the drive unit 102 in a first direction toward the target trim position in response to a determination that the actual trim position is not equal to the target trim position and that at least one of the following is true:

(1) a defined dwell time has elapsed since a previous control signal was sent to the trim actuator to trim the drive unit;
(2) a given number of previous control signals has not been exceeded in an attempt to achieve the target trim position; and
(3) a difference between the target trim position and the actual trim position is outside of a given deadband.

The first direction in which the controller 116 commands the trim actuator 106 to trim the drive unit 102 may be up if the actual trim position is less than the target trim position, or down if the actual trim position is greater than the target trim position. If the actual trim position is equal to the target trim position, the controller 116 does not send a control signal, but for example waits until the vessel speed has changed before carrying out the method once again. The method ends at block 710.

Requiring that at least one of conditions (1), (2), and (3) listed above are met decreases the busyness of the trim system, which might otherwise constantly be on (i.e., the hydraulic pump-motor combination 34 would be on and drawing current) while attempting to achieve a target trim position. For example, with respect to condition (1), requiring that a defined dwell time has elapsed since a previous control signal was sent to the trim actuator 106 to trim the drive unit 102 before another control signal is sent will prevent the auto-trim system from cycling between different trim setpoints. Instead, the system will make a correction and then wait for a given or calibrated amount of time before attempting another correction. The dwell time may, for example, be implemented by using a timer. With respect to condition (2), requiring that a given number of previous control signals has not been exceeded in an attempt to achieve the target trim position may prevent the system from continually overshooting and undershooting a trim setpoint that is not in fact obtainable.

In either case, if the user inputs a command such as on/resume, trim up, or trim down via the keypad 134 or touchscreen 136, the dwell time or attempt-limiting routines may be overridden. For instance, the drive unit 102 will trim up or down in response to a trim up or trim down command. The dwell-time timer and the attempt-limiting counter would be reset in the instance that the auto-trim on/resume command was selected, and the timer and counter would start over at zero for the next iteration of the method. This allows a user's direct command to supersede the dwell time and attempt-limiting algorithms, resulting in a response the user expects as a consequence of his or her input.

A similar concept is implemented by providing a deadband around the target trim position in which no further trim commands are initiated until a new target is set. For example, refer to condition (3), which requires that a difference between the target trim position and the actual trim position is outside of a given deadband before a control signal will be sent. Because the trim actuator moves in discrete increments, as described herein above with respect to FIG. 5, and as only so much control can be provided over how much the drive unit 102 moves in response to how much the trim actuator 106 moves, it is inefficient to initiate a trim movement when the error between the target trim position and the actual trim position is less than a discrete step that the trim actuator 106 is capable of accomplishing. Therefore, a correction will only be initiated when a difference between the target and the actual trim positions exceeds a deadband. In one example, the deadband is equal to the smallest discrete increment of change in trim position that the drive unit 102 is capable of achieving. This increment may be determined by the geometry of the drive unit 102 and/or trim actuator 106, the power of the hydraulic pump-motor combination 34, the responsiveness of the valves between the pump and the hydraulic piston-cylinder 32, etc.

It should be noted that in order for the first control signal to be sent, only one of conditions (1), (2), and (3) need be met, in addition to the condition that the actual trim position is not equal to the target trim position. In other examples, the algorithm might require that two or all three of the conditions be met in order for the first control signal to be sent. Additional conditions might also be required and the method would still fall in the scope of the present disclosure.

Figure 8:
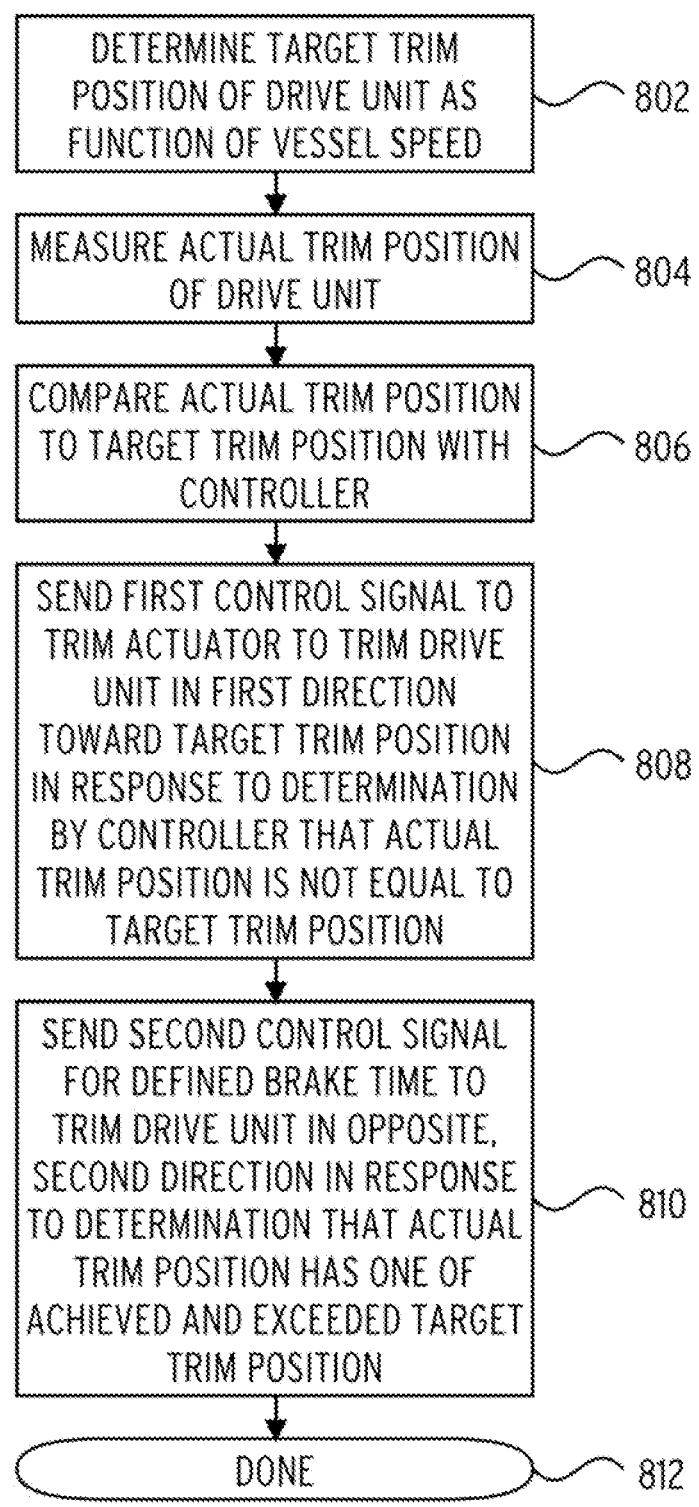
FIG. 8 illustrates another method for controlling a trim position of a trimmable drive unit with respect to a marine vessel in accordance with one embodiment of the present disclosure.

Another exemplary method according to the present disclosure is shown with respect to FIG. 8. In block 802, the controller 116 determines a target trim position of the drive unit 102 as a function of vessel speed. Again, this can be done according to the description provided above with respect to FIG. 5. In block 804, the controller 116 measures an actual trim position of the drive unit 102 using trim position sensor 124. In block 806, the controller 116 compares the actual trim position to the target trim position. In block 808, the controller 116 sends a first control signal to the trim actuator 106 to trim the drive unit 102 in a first direction toward the target trim position in response to a determination by the controller 116 that the actual trim position is not equal to the target trim position. If the actual trim position is less than the target trim position, the first direction will be up. If the actual trim position is greater than the target trim position, the first direction will be down. In block 810, the controller 116 sends a second control signal for a defined brake time to trim the drive unit 102 in an opposite, second direction in response to a determination that the actual trim position has one of achieved and exceeded the target trim position. If the first direction was up, then the second direction would be down, and vice versa. The method then ends at block 812.

By briefly sending a command to actuate the trim actuator 106 in a second direction opposite the first direction in which it was initially actuated to achieve the target trim position, freewheeling of the system can be minimized after the initial trim command is no longer present. A brief reverse actuation command may be especially helpful in systems where the trim actuator 106 is hydraulically actuated and the hydraulic pump-motor combination 34 is located remotely from the trim actuator 106. For example, there may be hydraulic fluid that continues to flow through the hydraulic lines to move the piston within the piston-cylinder 32 even after the controller 116 has commanded the motor controlling the pump to stop.

In order to ensure that the reverse actuation command is very brief, a timer may be used. For example, the algorithm may require that the reverse actuation command only be sent for a defined brake time on the order of tens of milliseconds. In one example, the defined brake time can be calibrated to minimize overshoot of the system. The brake time can be determined as a function of one or more of: how long it takes for the second control signal to result in movement of the trim actuator 106, the vessel speed, the target trim position, the actual trim position, and the type of drive unit 102. In most instances, the reverse actuation command will cause the motor driving the pump to momentarily reverse its polarity, but likely will not result in reverse actuation of the pump. Even if the motor is reverse-actuated for long enough that the pump overcomes inertial forces and is itself reverse actuated, the distance between the pump-motor combination 34 and the hydraulic piston-cylinder 32 will likely prevent the hydraulic piston-cylinder 32 from moving in a direction opposite that it in which it had initially been commanded. Thus, the reverse actuation command is intended to minimize freewheeling of the system and potential overshoot caused by inertia, rather than to actually trim the drive unit 102 in the opposite direction.

For example, the brake time may be longer when the vessel speed is high and the drive unit is being trimmed up, because the force of water will tend to push the drive unit up as well. Correspondingly, the brake time may be shorter when the vessel speed is high and the drive unit is being trimmed down. If the difference between the actual trim position and the target trim position is great, the brake time may be longer in order to counteract the longer time that hydraulic fluid has been flowing through the lines to make up the large trim differential. The brake time may be longer for drive units that are more massive and shorter for drive units that are less massive. In still other examples, the brake time may be a predetermined value.

According to yet another example of the present disclosure, the method may include learning a maximum achievable trim position of the drive unit 102 over time, and discontinuing sending the first control signal to the trim actuator 106 in response to a determination that both of the following are true: (1) the target trim position is greater than the maximum achievable trim position; and (2) the actual trim position is within the deadband of the maximum achievable trim position. By way of example, this ensures that if the target trim position is 40%, but the system can only achieve 38% due to loading, or system leakage or age, the system would consider 38% to be full trim and would stop attempting to achieve 40%. In this example, the controller 116 would learn the maximum of 38% over time during different iterations of the trim control method. In one example, the maximum achievable trim position is proximate a demarcation between a trim range and a tilt range of the drive unit 102. For example, referring back to FIG. 6, the drive unit 102 may be trimmable to an angle A1, where it is at angle from vertical V that provides a functional depth of the propeller 103 in the water 110 for propelling the vessel 100. The drive unit 102 may alternatively be trimmed to an angle A1+A2, where its centerline CL2 is at an angle from vertical V that raises the propeller 103 out of the water 110 altogether. Such a position is in the drive unit's tilt range, which includes angles of the drive unit 102 from vertical V that may be required for towing the marine vessel or for transportation by land. The line D thus represents a demarcation between a trim range and a tilt range of the drive unit 102. The maximum achievable trim angle may be proximate this demarcation line D.

Below the demarcation line D, the system 111 is given more authority (i.e., pressure or force) to change the trim position of the drive unit 102, which is needed because the propeller 103 is in the water 110 and the trim actuator 106 must provide enough force to push up against the water tending to push the drive unit 102 down. In contrast, above the demarcation line D, the propeller 103 is out of the water 110 and the system 111 is thus provided with less authority to tilt the drive unit 102 in this range due to lack of a counteracting force of water on the drive unit 102. As the drive unit 102 trims up to this demarcation line D, however, the system switches from having more authority to having less authority, and the trim actuator 106 might then not have enough authority to reach a particular trim angle even if the drive unit 102 is still in the trim range. In this instance, similar to when the trim system is leaking or is old, it is not efficient to keep the trim relay on in an attempt to achieve a trim position that is not in fact obtainable.

In one example, the method includes learning the maximum achievable trim position only when the target trim position is greater than a given trim position, in order to ensure that the trim position being learned really is near the top of the achievable trim range. For instance, the given trim position may be one that is within 10 percent of the demarcation D between the trim range and the tilt range, as determined by a calibrated value saved in the memory 114, or as determined by a previously-measured actual trim position that was saved as the maximum achievable trim position. In another example, the method includes learning the maximum achievable trim position only when a rate of change of the actual trim position has been less than a given rate of change for a given period of time, signifying that the system has truly stalled in an attempt to reach the target position. In some instances, both of these criteria must be met in order for the controller 116 to save the actual trim position of the drive unit 102 as the updated, learned maximum achievable trim position.

Once the maximum achievable trim position is learned (i.e., stored in the memory 114), the system 111 will not continually attempt to achieve the target trim position of, for example, 40%, but will instead cease the trim up command once the maximum achievable trim position is reached. Even if the maximum achievable trim position cannot be reached exactly, the system 111 will cease the trim up command once the actual trim position is within the above-noted deadband of the maximum achievable trim position. In other words, if the last increment required to obtain the maximum achievable trim position is smaller than an amount by which the trim actuator 106 is able to move the drive unit 102, energy will not be expended in an attempt to close this gap. The actual trim position is considered to be close enough to the maximum.

The methods described with respect to the maximum achievable trim position result in a system that is more energy efficient than one that continually attempts to reach a target trim position that cannot be reached, because the trim up relay will not stay energized trying to achieve an unobtainable trim position. Additionally, the methods accommodate system-to-system variability, in which one trim system does not respond in the same manner as another due to the above-mentioned factors. For example, a different maximum trim position can be learned by each system 111 installed on each vessel 100, and that maximum can change over the lifetime of each system 111.

Now turning to FIGS. 9 and 10, a control method that may be carried out by the processor 112 executing instructions stored in the memory 114 of the controller 116 will be described. The method of FIGS. 9 and 10 combines the methods described with respect to FIGS. 7 and 8, adds a few of the supplementary steps discussed herein above, and provides one example order for separate determinations that may be made by the controller 116. It should be noted that other orders for carrying out the method could be used that would result in the same or similar outcome. The method begins at block 902. At block 904, the controller 116 determines a target trim position as a function of vessel speed, as described herein above. At block 906, a trim position sensor 124 is used to measure the actual trim position of the drive unit 102. At block 908, the controller 116 determines whether the actual trim position is equal to the target trim position. If yes, the method returns to start at block 902.

Figure 7:
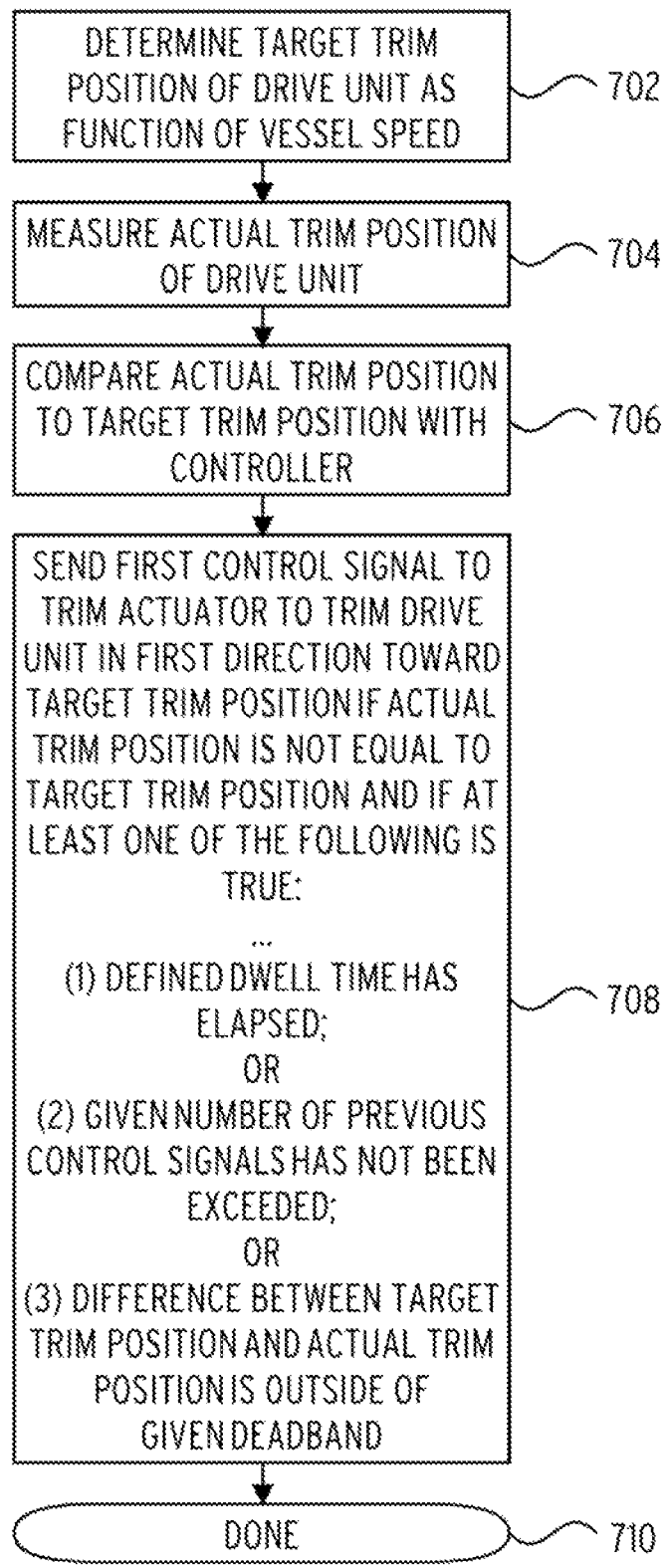
FIG. 7 illustrates a method for controlling a trim position of a trimmable drive unit with respect to a marine vessel in accordance with one embodiment of the present disclosure.

If no at block 908, the method continues to block 910, where the controller 116 begins to make determinations regarding conditions (1), (2), (3) described herein above with respect to FIG. 7. It should be noted that the method does not require that the determinations made at blocks 910, 912, and 914 be made in the order shown herein, and that one or more of these determinations may be removed from the method depending on programming. At block 910, the controller 116 determines whether a defined dwell time has elapsed. If no, the controller 116 determines if a number of previous control signals has not yet been exceeded, as shown at block 912. If no, the controller 116 determines whether the difference between the target trim position and the actual trim position is outside of a given deadband, shown in block 914 as a determination regarding whether ABS (TARGET−ACTUAL)>DEADBAND. If no at 914, the method returns to start at 902. In other words, although the actual trim position is not equal to the target trim position (see block 908), none of the other enable conditions are true, and thus the controller 116 will not send a control signal to trim the drive unit 102. On the other hand, if the controller 116 determines that any of the conditions at blocks 910, 912, 914 is true (YES) the method continues to block 916, and the controller 116 sends a first control signal to trim the drive unit 102 in the first direction toward the target trim position. In other examples, the controller 116 may require that two or all three of blocks 910, 912, and 914 be true in order to continue to block 916.

Figure 10:
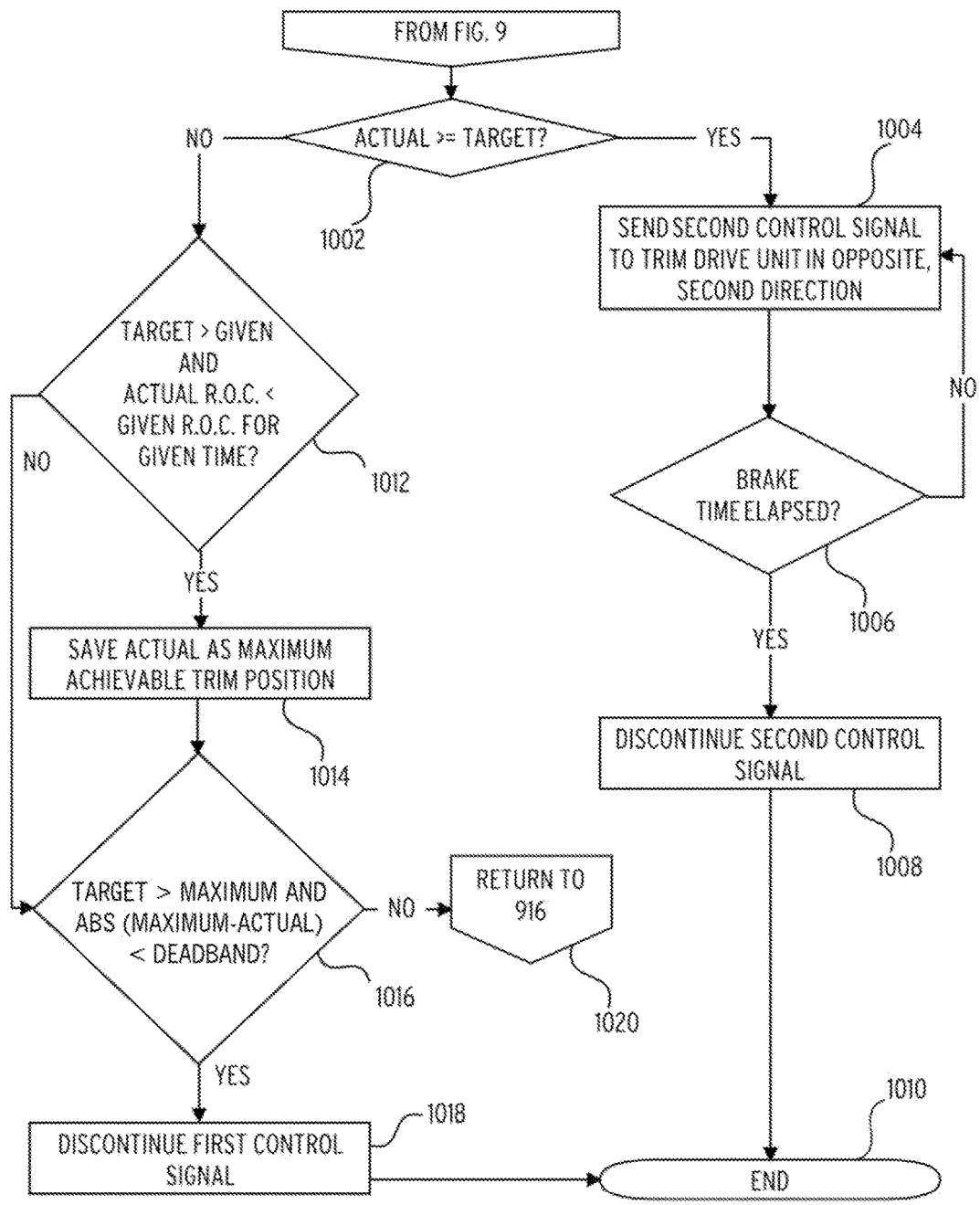
FIG. 10 is a continuation of the flow diagram of FIG. 9.

Continuing in FIG. 10, at block 1002, the controller 116 determines whether the actual trim position is greater than or equal to the target trim position (i.e., whether the target has been obtained). The actual trim position may be equal to the target trim position in the instance that the trim actuator 106 has enough exactitude to reach the target; however, the actual trim position may be greater than the target in the instance where the increments by which the trim actuator 106 is able to trim the drive unit 102 are greater than a remaining difference between the actual and target trim positions. If the answer at block 1002 is YES, the controller 116 may send a second control signal to trim the drive unit 102 in an opposite, second direction, as shown at block 1004. The controller 116 will then make a determination at block 1006 as to whether or not the above-described brake time has elapsed. If not, the controller 116 will continue sending the second control signal. If yes, the controller 116 will discontinue the second control signal as shown at block 1008, and the routine will end at block 1010.

Returning to the determination made at block 1002, if the actual trim position is not greater than or equal to the target trim position, the method continues to block 1012, where the controller 116 determines whether the target trim position is greater than a given trim position (which, recalling from the discussion regarding FIG. 6, may be a trim position that is within 10% of the demarcation D between the trim range and the tilt range), and where the controller 116 determines whether the actual rate of change in trim position has been less than a given rate of change in trim position for a given period of time. As mentioned above, the controller 116 could alternatively determine whether only one of these things is true in order to continue with the method. If YES at block 1012, the controller 116 will save the actual trim position (measured with trim position sensor 124) as a MAXIMUM ACHIEVABLE TRIM POSITION in the memory 114, as shown at block 1014. This may be the first time that the value of the maximum achievable trim position has been stored, or this may require updating of a previously-stored maximum achievable trim position from a previous time the method was carried out. Recall, this value may change over the life of the system or based on load conditions. The method then continues to block 1016, where the controller 116 determines whether the target trim position is greater than the maximum trim position and whether the actual trim position is within the deadband of the maximum achievable trim position (denoted here as ABS [MAXIMUM−ACTUAL]<DEADBAND). As mentioned above, the algorithm may instead require that only one of these conditions is true in order to continue with the method. If YES at block 1016, the method continues to block 1018, and the controller 116 discontinues sending the first control signal. The method ends at block 1010.

If the determination at block 1012 is NO, then a previous maximum achievable trim position is retrieved from the memory 114 of the controller 116, and the method continues at block 1016. In other words, there is not a new maximum achievable trim position that needs to overwrite the old one.

Figure 9:
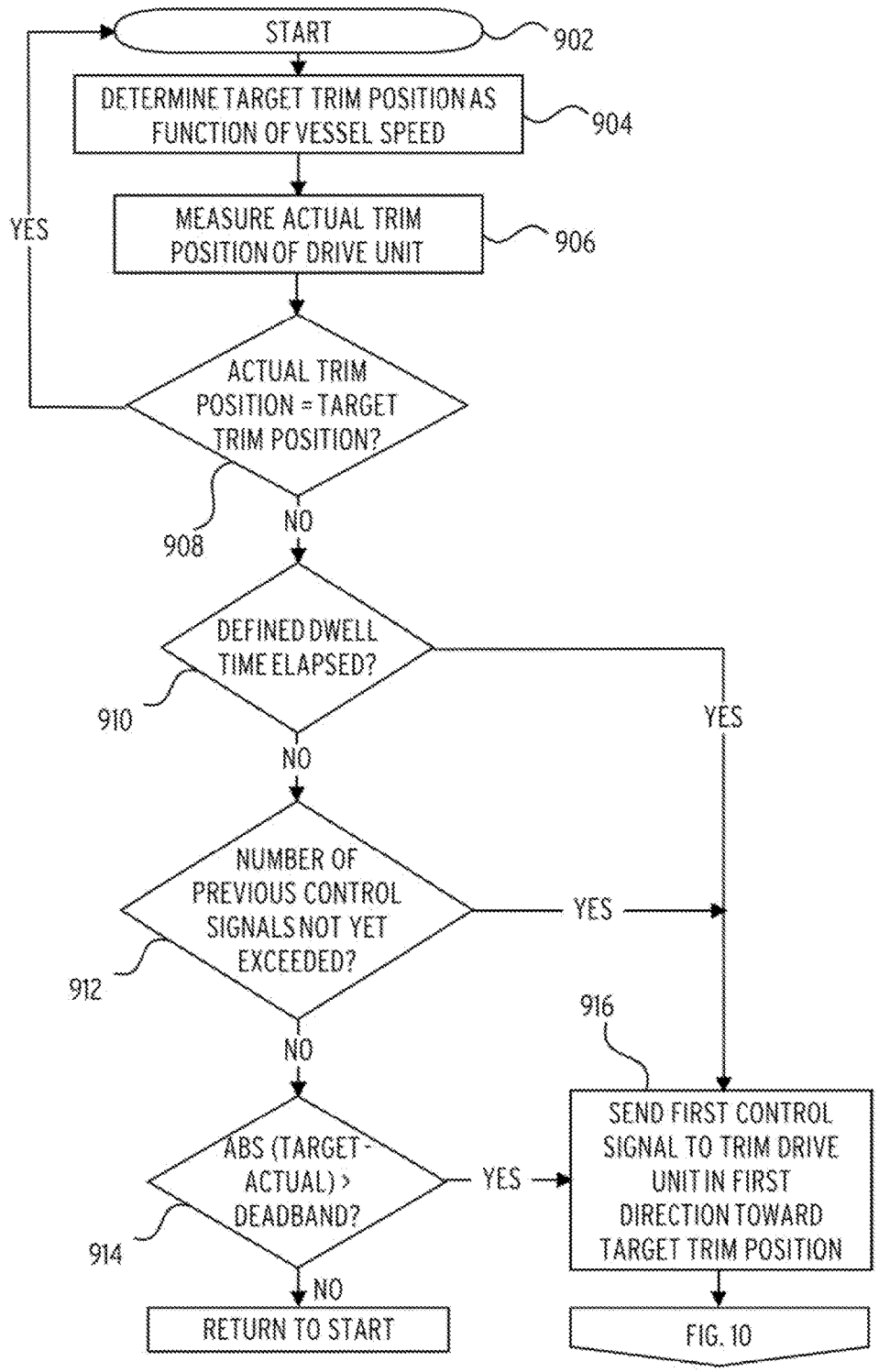
FIG. 9 is a flow diagram showing determinations made by a controller carrying out a method according to one example of the present disclosure.

If the determination at block 1016 is NO, the method continues to block 1020, where it returns to block 916 (FIG. 9). At block 916, the controller 116 continues to send the first control signal to trim the drive unit 102 toward the target trim position. This is done until the determination at block 1002 is that the actual trim position is greater than or equal to the target trim position (YES) or until the determination at block 1018 is that the maximum achievable trim position has been obtained (plus or minus the deadband). In either case, the method eventually ends at 1010. Eventually, when the controller 116 detects that the vessel speed has changed, the method will begin again at block 902.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for controlling a trim position of a trimmable drive unit powered by an engine with respect to a marine vessel, the method comprising:
    with a controller, determining a target trim position of the drive unit as a function of at least one of a speed of the vessel and a speed of the engine;
    measuring an actual trim position of the drive unit;
    comparing the actual trim position to the target trim position with the controller; and
    sending a first control signal to a trim actuator to trim the drive unit in a first direction toward the target trim position in response to a determination by the controller that the actual trim position is not equal to the target trim position and that at least two of the following are true:
        a defined dwell time has elapsed since a previous control signal was sent to the trim actuator to trim the drive unit;
        a given number of previous control signals has not been exceeded in an attempt to achieve the target trim position; and
        a difference between the target trim position and the actual trim position is outside of a given deadband.

2. The method of claim 1, further comprising sending a second control signal for a defined brake time to trim the drive unit in an opposite, second direction in response to a determination that the actual trim position has one of achieved and exceeded the target trim position.

3. The method of claim 2, wherein the brake time is on the order of tens of milliseconds.

4. The method of claim 3, further comprising determining the brake time as a function of one or more of: how long it takes for the second control signal to result in movement of the trim actuator, the vessel speed, the target trim position, the actual trim position, and a type of the drive unit.

5. The method of claim 1, further comprising:
 learning a maximum achievable trim position of the drive unit over time; and
 discontinuing sending the first control signal to the trim actuator in response to a determination that both of the following are true:
  the target trim position is greater than the maximum achievable trim position; and
  the actual trim position is within the deadband of the maximum achievable trim position.

6. The method of claim 5, wherein the maximum achievable trim position is proximate a demarcation between a trim range and a tilt range of the drive unit.

7. The method of claim 6, further comprising learning the maximum achievable trim position only when the target trim position is greater than a given trim position and a rate of change of the actual trim position has been less than a given rate of change for a given period of time.

8. The method of claim 7, wherein the given trim position is within 10 percent of the demarcation between the trim range and the tilt range.

9. The method of claim 1, wherein the deadband is a smallest discrete increment of change in trim position that the drive unit is capable of achieving.

10. The method of claim 1, wherein the trim actuator comprises a hydraulic piston-cylinder in fluid communication with a hydraulic pump-motor combination.

11. A system for controlling a trim position of a trimmable drive unit powered by an engine with respect to a marine vessel, the system comprising:
 a trim actuator positioning the drive unit with respect to the marine vessel;
 a trim sensor that determines an actual trim position of the drive unit; and
 a controller that determines a target trim position of the drive unit as a function of at least one of a speed of the marine vessel and a speed of the engine, the controller being in signal communication with the trim actuator and the trim sensor;
 wherein the controller compares the actual trim position to the target trim position; and
 wherein the controller sends a first control signal to the trim actuator to trim the drive unit in a first direction toward the target trim position and to the target trim position or to a maximum achievable trim position of the drive unit in response to a determination that the actual trim position is not equal to the target trim position and that at least one of the following is true:
  a defined dwell time has elapsed since a previous control signal was sent to the trim actuator to trim the drive unit;
  a given number of previous control signals has not been exceeded in an attempt to achieve the target trim position; and
  a difference between the target trim position and the actual trim position is outside of a given deadband.

12. The system of claim 11, wherein the controller further sends a second control signal for a defined brake time to trim the drive unit in an opposite, second direction in response to a determination that the actual trim position has one of achieved and exceeded the target trim position.

13. The system of claim 12, wherein the brake time is on the order of tens of milliseconds.

14. The system of claim 13, wherein the controller determines the brake time as a function of one or more of: how long it takes for the second control signal to result in movement of the trim actuator, the vessel speed, the target trim position, the actual trim position, and a type of the drive unit.

15. The system of claim 11, wherein the controller further:
 learns the maximum achievable trim position of the drive unit over time; and
 discontinues sending the first control signal to the trim actuator in response to a determination that both of the following are true:
  the target trim position is greater than the maximum achievable trim position; and
  the actual trim position is within the deadband of the maximum achievable trim position.

16. The system of claim 11, wherein the deadband is a smallest discrete increment of change in trim position that the drive unit is capable of achieving.

17. The system of claim 11, wherein the trim actuator comprises a hydraulic piston-cylinder in fluid communication with a hydraulic pump-motor combination.

18. The system of claim 11, wherein the trim actuator comprises an electric linear actuator.

19. A method for controlling a trim position of a trimmable drive unit powered by an engine with respect to a marine vessel, the method comprising:
 with a controller, determining a target trim position of the drive unit as a function of one of a speed of the vessel and a speed of the engine;
 measuring an actual trim position of the drive unit;
 comparing the actual trim position to the target trim position with the controller;
 sending a first control signal to a trim actuator to trim the drive unit in a first direction toward the target trim position in response to a determination by the controller that the actual trim position is not equal to the target trim position; and
 sending a second control signal for a defined brake time to trim the drive unit in an opposite, second direction in response to a determination that the actual trim position has one of achieved and exceeded the target trim position;
 wherein the brake time is on the order of tens of milliseconds.

20. The method of claim 19, further comprising:
 learning a maximum achievable trim position of the drive unit over time; and
 discontinuing sending the first control signal to the trim actuator in response to a determination that both of the following are true:
  the target trim position is greater than the maximum achievable trim position; and
  the actual trim position is within a given deadband of the maximum achievable trim position.

\* \* \* \* \*